(12) United States Patent
Lin

(10) Patent No.: US 8,239,427 B2
(45) Date of Patent: Aug. 7, 2012

(54) DISK LAYOUT METHOD FOR OBJECT-BASED STORAGE DEVICES

(75) Inventor: Hsu-Cheng Lin, Kaohsiung (TW)

(73) Assignee: Industrial Technology Research Institute, Hsinchu (TW)

( * ) Notice: Subject to any disclaimer, the term of this patent is extended or adjusted under 35 U.S.C. 154(b) by 333 days.

(21) Appl. No.: 12/437,309

(22) Filed: May 7, 2009

(65) Prior Publication Data

US 2010/0131561 A1 May 27, 2010

(30) Foreign Application Priority Data

Nov. 25, 2008 (TW) ................................ 97145449 A

(51) Int. Cl.
*G06F 17/30* (2006.01)
(52) U.S. Cl. ........................................................ 707/823
(58) Field of Classification Search .................. 707/821, 707/823, 829–830
See application file for complete search history.

(56) References Cited

U.S. PATENT DOCUMENTS

| | | | |
|---|---|---|---|
| 2006/0129614 A1* | 6/2006 | Kim et al. ...................... | 707/202 |
| 2006/0179037 A1* | 8/2006 | Turner et al. ...................... | 707/3 |
| 2007/0185902 A1* | 8/2007 | Messinger et al. ......... | 707/103 R |
| 2008/0183777 A1* | 7/2008 | Xi et al. ......................... | 707/205 |

OTHER PUBLICATIONS

Feng Wang, OBFS: A file System for Object-based Storage Device, Apr. 2004, Mass Storage Systems and Technology, p. 1-13.*
David Du, Experiences Building an Object-Based Storage System based on the OSD T-10 Standard, 2006, DTC Initelligent Storage Consortium University of Minnesota, p. 1-11.*

* cited by examiner

*Primary Examiner* — Thu-Nguyet Le
(74) *Attorney, Agent, or Firm* — Lowe Hauptman Ham & Berner, LLP

(57) ABSTRACT

A disk layout method for object-based storage devices is disclosed. A disk is initialized and a root object is added while a set of blocks of the disk are configured to store attributes of the root object, a free block index table, and a partition object index table. When a partition object is added, a set of blocks of the disk are configured to store attributes of the partition object, a collection object index table, and a user object index table, wherein the partition object indexes the location of a collection object according to the collection object index table and the location of a user object according to the user object index table. When a collection or user object is added, necessary blocks of the disk are configured to store individual data.

42 Claims, 17 Drawing Sheets

DISK LAYOUT METHOD FOR OBJECT-BASED STORAGE DEVICES

CROSS REFERENCE TO RELATED APPLICATIONS

This Application claims priority of Taiwan Patent Application No. 97145449, filed on Nov. 25, 2008 the entirety of which is incorporated by reference herein.

TECHNICAL FIELD

The disclosure relates to a disk layout method for object-based storage devices.

BACKGROUND

Current network storage architecture comprises network-attached storage (NAS) and storage area network (SAN). The network-attached storage stores metadata in a file server that results in low performance of the file server due to mass access. A storage area network has been developed to solve the problem generated by the network-attached storage architecture, but network security problems are then generated. Thus, an object-based storage device (OSD) has been developed and serves as a solution for higher performance and better security of network storages.

The object-based storage device provides storage with self-management, sharing, and security under the network storage architecture and transfers low-level functions, such as space management, from a file system to a disk device which comprises a standard object interface for access. Additionally, contents and methods for object access are defined under the OSD architecture and a disk output method corresponding to the OSD architecture and specifications are defined. Currently, implementation of the OSD architecture, for example, comprises simulation using a traditional file system, such as the second extended file system (Ext2) under the Linux operating system, or a new developed disk layout for the OSD architecture, such as the object-based file system (OBFS) and object-based storage device file system (OSDFS). The architecture of the object-based file system or the object-based storage device file system is approximately similar to the architecture of the second extended file system, wherein differences comprise differences in size of changeable blocks and index methods. Implementations of the OSD architecture are described in the following.

The OSD is object-based and recognizes objects according to unique identification codes (ID). The objects comprise root, partition, collection, and user objects. The objects respectively having different attribute layouts. Thus, an object description method for special object specifications must be designed and stored in a physical device.

FIG. 1 is a schematic view of disk layout of the second extended file system (Ext2). As shown in FIG. 1, a disk partition comprises a superblock recording file system information and block groups which are generated according to the size of the partition. The superblock records the number of blocks, free and used blocks, the number of inodes, and so forth. Each block group comprises group information recording free blocks, used blocks, inodes, and data blocks storing data. Information relating to a file and catalog is stored in the inodes. The catalog represents a file with a special format which can be referred to, to create hierarchical relationships between files and catalogs.

FIG. 2 is a schematic view of disk layout of the object-based file system (OBFS). Referring to FIG. 2, the architecture of the object-based file system is approximately similar to the architecture of the second extended file system (Ext2), wherein a disk is divided into regions with the same size, such as 256 megabytes (MB). The size of a region is allocated based on user or system requirements. Additionally, each region can be divided to multiple large or small blocks based on the file size to be stored. Metadata of each region is stored in an onode. The metadata stores states of each object and indexes an object according to a region ID and an object ID.

Thus, some drawbacks of the implementations of OSD file systems are exposed. Current OSD file systems are simulated using conventional file systems, such as the Ext2, the third extended file system (Ext3), and so forth. Traditionally, disk layout of the Linux operating system is implemented based on the inodes. The metadata (such as creating time points) of the disk layout cannot completely describe an object but can only simulate the object, such that the way for implementation and features of the Linux operating system are different than that of the object-based storage device. Further, some new disk layout methods for the object-based storage device (such as the object-based file system (OBFS) or object-based storage device file system (OSDFS)) are designed according to current file systems and features of the object-based storage device but are not specially developed based on features of the specification of the object-based storage device. Thus, storage of full attributes is not provided such that ability of object description is inadequate.

Additionally, the deficiencies of current designs of OSD disk layout include less object portability under network storage architecture, less flexibility of disk uses, less object integrity and less ability of efficiently indexing objects. Besides, some designs of OSD disk layout are unable to follow the memory management rules of modem operating systems. Thus, full features of the object-based storage device cannot be completely revealed using current access methods for file systems and the dependent relationships of objects can only be shown by using other methods.

SUMMARY

Consistent with the invention, there is provided a disk layout method for object-based storage devices comprises the following. The disk is initialized and a root object is added to the disk. One or multiple block sets are configured in the disk while the root object is being added, wherein the block sets store attributes of the root object, a free block index table, and a partition object index table, wherein the root object indexes a location of a partition object according to the partition object index table. A partition object is added to the disk. One or multiple block sets are configured in the disk while the partition object is being added, wherein the block sets store attributes of the partition object, a collection object index table, and a user object index table, and the partition object indexes a location of a collection object according to the collection object index table and a location of a user object according to the user object index table. A user object is added to the disk. One or multiple block sets are configured in the disk while the user object is being added, wherein the block sets store attributes and data of the user object.

Also consistent with the invention, there is provided a disk layout method for object-based storage devices comprises the following. A disk is configured so that a root object, at least one partition object, and at least one user object are allocated. The root object comprises attributes of the root object, a free block index table, and a partition object index table which is used by the root object to index a location of a partition object. The partition object comprises attributes of the partition object, a collection object index table which is used by the partition object to index a location of a collection object, and a user object index table which is used by the partition object to index a location of a user object. The user object comprises attributes and data of the user object.

Further, and consistent with the invention, there is provided a computer-readable medium encoded with computer executable instructions for performing a disk layout method for object-based storage devices is further provided. The computer executable instructions comprises initializing the disk and adding a root object to the disk, configuring one or multiple block sets in the disk while the root object is being added, wherein the block sets store attributes of the root object, a free block index table, and a partition object index table, and the root object indexes a location of a partition object according to the partition object index table, adding a partition object to the disk, configuring one or multiple block sets in the disk while the partition object is being added, wherein the block sets store attributes of the partition object, a collection object index table, and a user object index table, and the partition object indexes a location of a collection object according to the collection object index table and a location of a user object according to the user object index table, adding a user object to the disk, and configuring one or multiple block sets in the disk while the user object is being added, wherein the block sets store attributes and data of the user object.

It is to be understood that both the foregoing general description and the following detailed description are exemplary and explanatory only and are not restrictive of the invention, as claimed.

BRIEF DESCRIPTION OF THE DRAWINGS

The invention can be more fully understood by reading the subsequent detailed description and examples with references made to the accompanying drawings, wherein.

DETAILED DESCRIPTION

Figure 1:
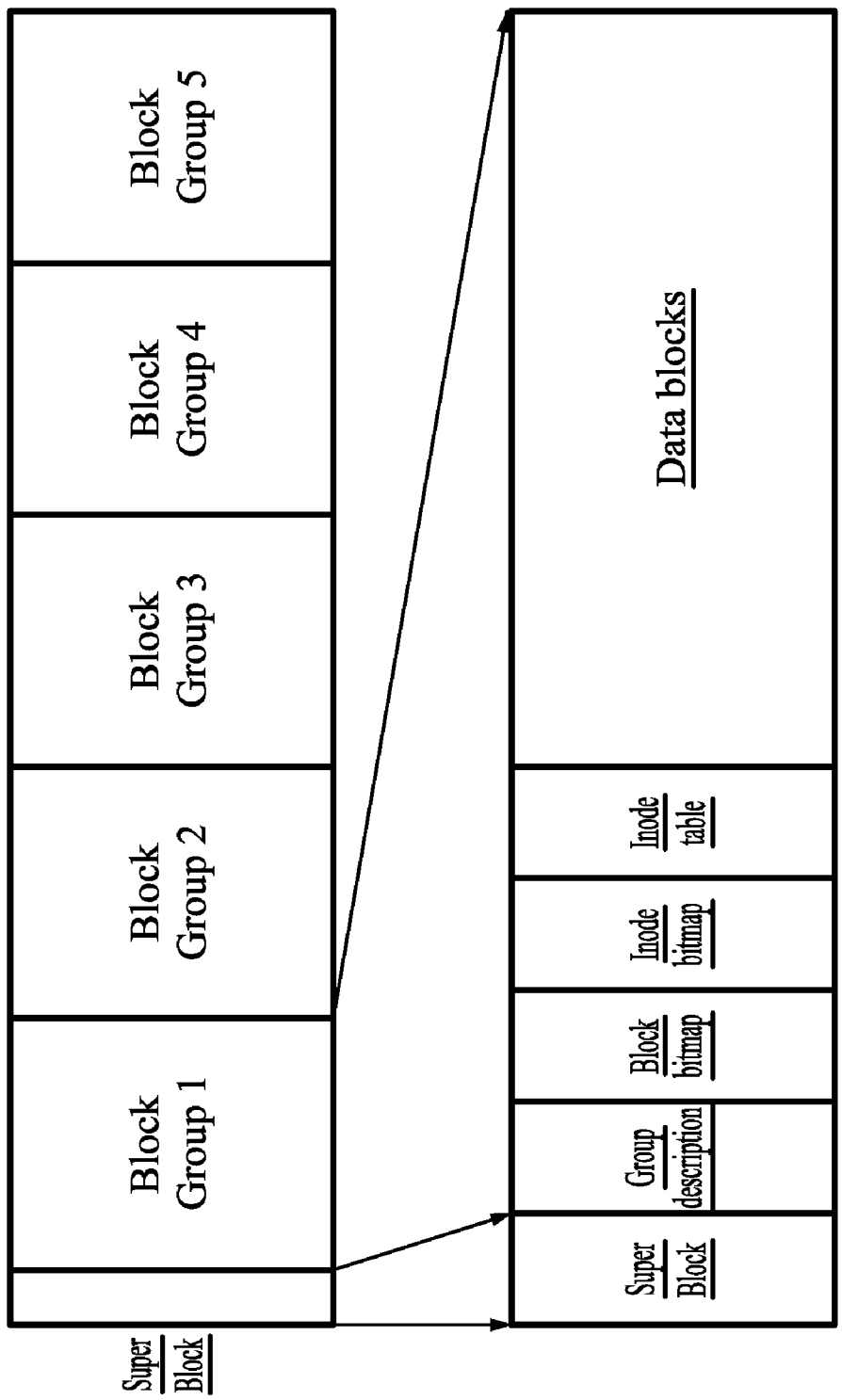
FIG. 1 is a schematic view of disk layout of the second extended file system (Ext2)
Figure 2:
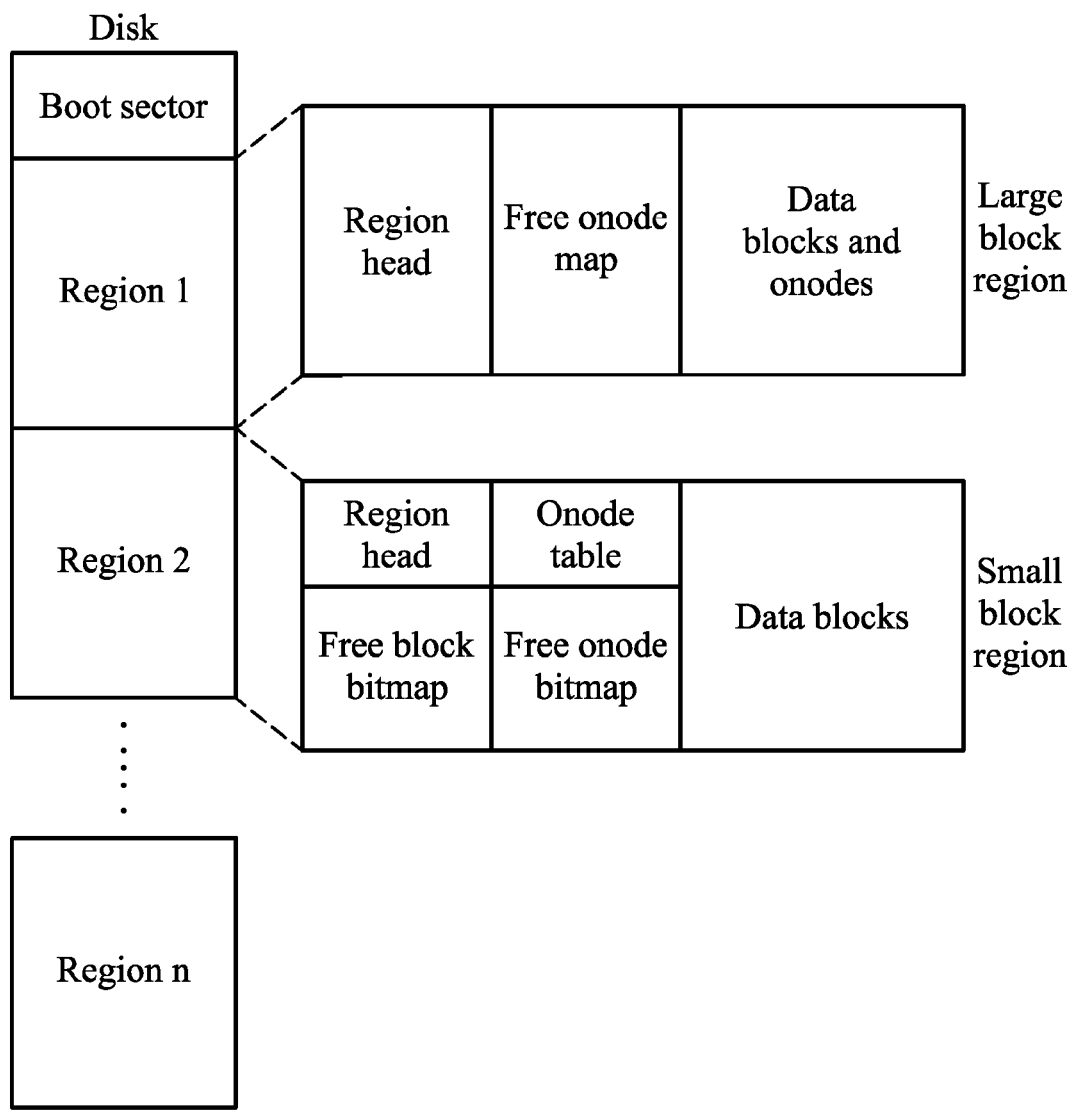
FIG. 2 is a schematic view of disk layout of the object-based file system (OBFS)

Several exemplary embodiments consistent with the invention are described with reference to FIGS. 3 through 14, which generally relate to a disk layout method for object-based storage devices. It is to be understood that the following disclosure provides various different embodiments as examples for implementing different features of the invention. Specific examples of components and arrangements are described in the following to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various described embodiments and/or layouts.

Disk layout is a basic way to perpetually store data. A traditional file system allows rapid and stable access of a hard disk representing relative contents to an end user. A hierarchical style is applied to store the file system, such as the Ext2, the Ext3, or the new technology file system (NTFS) hierarchical style, which define respective disk layout methods. However, data storage methods with different object types have special requirements, comprising specific object types and attributes of each object type, and must access objects according to their IDs. Currently, only the object-based file system (OBFS) and the object-based storage device file system (OSDFS) defines their respective disk layouts, but data access thereof is still restricted.

Figure 3:
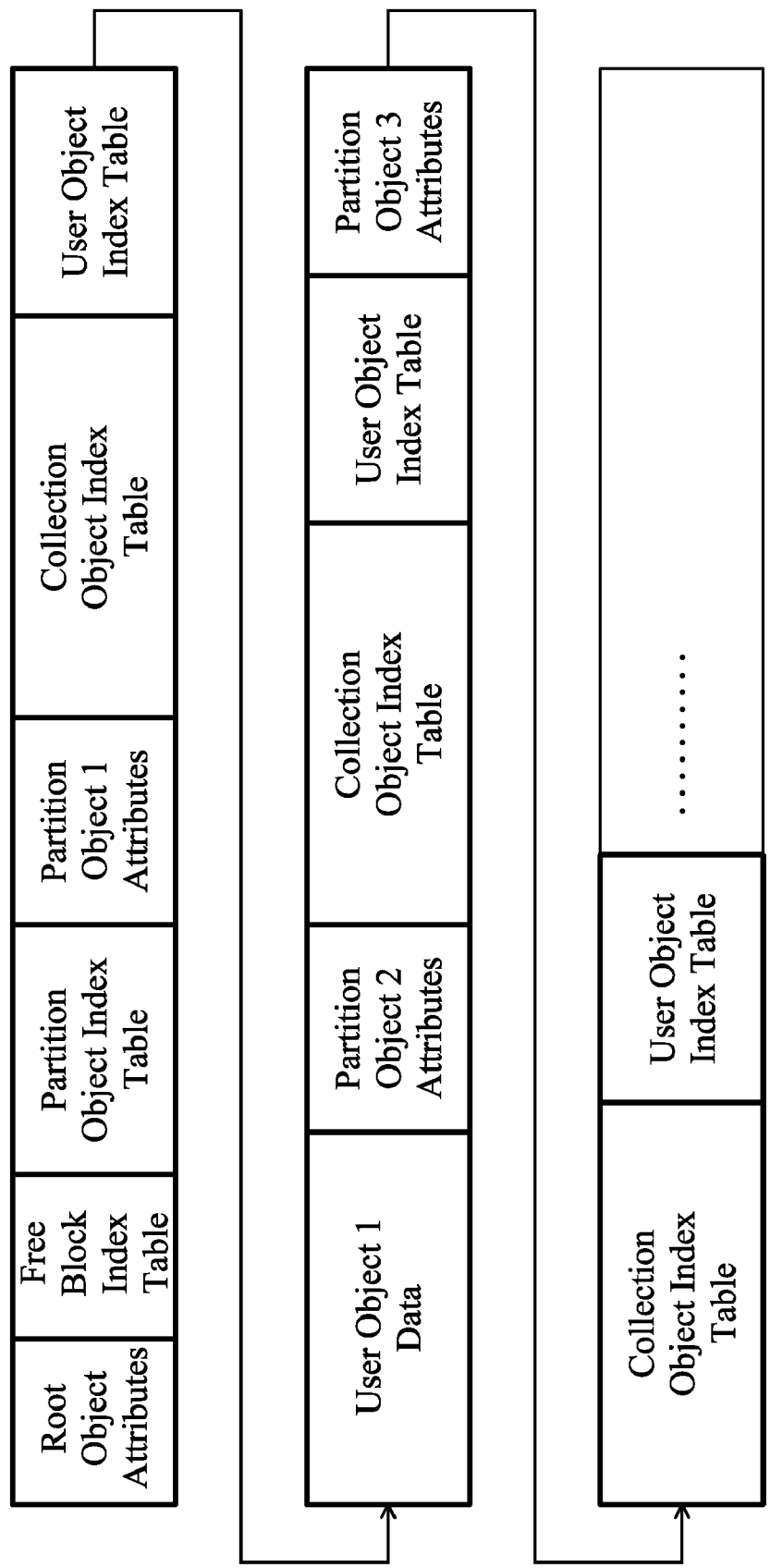
FIG. 3 is a schematic view of disk layout of the exemplary embodiment consistent with the present invention.

Based on definitions of the OSD specification, the number of objects to be used is unlimited. The invention supports the definitions of the OSD specification. FIG. 3 is a schematic view of disk layout of the exemplary embodiment consistent with the present invention. Referring to FIG. 3, an embodiment of the disk layout comprises attributes of a root object, attributes of a partition object, attributes of a user object, and data sections of the user object. Division of the disk is not preset and the number of divisions is supported by limitation of the disk. The root object which is equivalent to the superblock of the second extended file system (Ext2) comprises attributes and free blocks or indexes of a free partition object. Additionally, the partition object can be created unlimitedly in the root object in this embodiment. In addition to attribute blocks, the partition object further comprises free blocks, used indexes of the collection object, and indexes of the user object. Further, the invention supports extra table to the collection object to record IDs of each user object, which are belonged to the collection. Each object comprises indexes for directly been accessed to their attributes and data blocks.

Storage concept for the object-based storage device is described in the following.

The object-based storage device serves as a device which stores data of objects. Each object is stored according to a data sequence and assigned an ID so data access must be performed based on the IDs. Externally, data represents an object instead of a file composed of blocks and is stored in a storage medium using a security mechanism. The objects comprise a root object, partition objects, collection objects, and user objects. Each of the objects comprises respective attributes, described as follows.

The root object is used to describe storage space of logic units and manage partition objects. A partition object is used to describe storage space of collection objects and user objects and security and space limitation of the collection and user objects. A collection object, a manageable object, is used for classifying and indexing user objects. A user object is used for storing user data.

The disk layout of the object-based storage device consistent with the invention is described with several parts.

Disk Layout Concept

A logic unit of a disk is created and storage architecture for disk layout of the logic unit is shown in FIG. 3. Suppose the default size of basic unit, called block, of a disk to store data is 4K bytes. The size of the block can also be user-defined and, however, based on convenience of storing attribute data, integrity of space usage, and correspondence to memory management of an operating system, a block with 4K bytes is optimum for the disk layout.

The root object automatically describes the object-based storage device so that the object-based storage device serves as the only root object when objects are stored in the object-based storage device. The root object comprises and stores attributes thereof in the first block of the disk. The first block resides in an offset with 1024 bytes. If the entire disk is used by the object-based storage device, a sector is reserved for a boot loader. Thus, a free block index table is located after the attribute block and a partition object index table is located after the free block index table. Since the partition objects can be unlimitedly generated, an index table which can store a large number of partition objects is required, of which, allocation and usage are described in the following.

A partition object serves as a container to store collection objects and user objects. When a new partition object is created, an attribute block for the partition object is then created and a used collection object index table and user object index table are located after the attribute block.

Basic Attribute Data

Besides for attributes defined in the OSD specification, self-defined attributes are further provided to satisfy the operating system and disk layout. Attributes which may be used in the embodiment are described as follows but is not limitative.

"Extra attributes of the root object": The attributes are similar to the superblock supported by the second extended file system (Ext2), which records usage information of all blocks, the number of blocks used by the attributes, records relating to each object index table, the length of a block address (ex. 32 or 64 bits), the length of an object ID (ex. 32 or 64 bits), a counter for the object ID, and other attributes.

"Extra attributes of a partition object": The attributes record information relating to the collection and user object index tables, comprising start locations and the size of an index table and other attributes whenever configured.

"Extra attributes of a collection object": The attributes record the size and location of a user object ID index table. Since a many-to-many relationship is provided between the user object and the collection object, mutual indexing must be performed for rapid searching.

"Extra attributes of a user object": Since the user object is responsible for storing data, if the data amount is less than the size of an attribute and data is less than the size of a block (such as 4K bytes), the data can be stored in an attribute style. In other words, a field for in-property data is provided in an attribute table and the data is stored in the field.

If the data of the user object are not stored with the style of the in-property data, which indicates that the data are stored in extra blocks, the user object uses an attribute, called block list, in the attribute table to record used blocks.

A block list is composed of multiple successive records and each of the records stores locations and lengths of data blocks. First 1 or 2 bytes of the block list is used to record the number of linked data blocks and then record the data blocks by a set of a location and a length. The format of content of each record is extent-based which is represented by "Location+ Length". As an example of a configuration with 32 bits, the size of used space is represented by adding the Location (32 bits) to the block length (32 bits) which is equal to 8 bytes. A located position indicates the n-th block instead of a real address. The real address must be calculated using a formula represented by "n×the size of a block" (for example, 4K, 8K, and so on). With respect to a block with 4K bytes, when the Location is equal to 100, the real address of the block is represented by 100×4K. Variables of the formula are described in the following.

Figure 4:
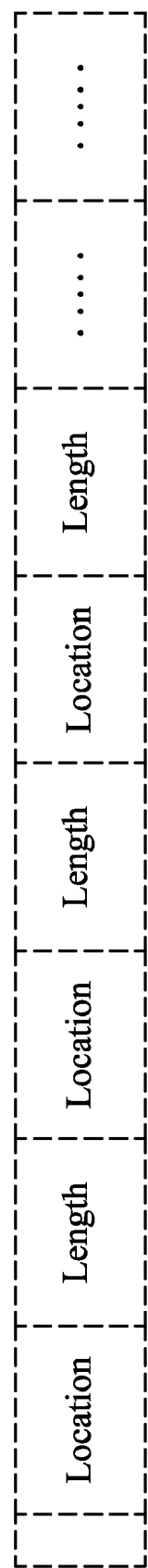
FIG. 4 is a schematic view of arrangement of data blocks of a user object of the exemplary embodiment consistent with the present invention.

FIG. 4 is a schematic view of arrangement of data blocks of a user object of the exemplary embodiment consistent with the present invention. Referring to FIG. 4, the first field is assigned 1 byte for recording the amount of data blocks which have been stored. There are 255 discontinuous blocks at most which can be stored.

"Location (32 bits, for example)": $2^{32}$ blocks can be used and addressed by the address space of $2^{32} \times 4K = 17592G$ bytes=16T bytes.

"Length (32 bits, for example)": The number of successive blocks which can be used. A single successive block can be assigned an address space with $2^{32} \times 4K = 17592G$ bytes=16T bytes.

For example, if only a block with 4K bytes is assigned to an attribute, suppose 3K bytes are assigned to basic attributes, wherein only 1K bytes can be assigned to the block list and 2 bytes for the number of records, (1024−2)/8=127 discontinuous data space at most can be recorded. Alternatively, the in-property data is assigned a 1K address space. If the size of requested disk space exceeds any available record from the free block index table, it indicates that the disk space may be exhausted resulting in dispersive sectors, the disk must be defragged.

Usage of Indexes and Index Tables

The index table plays an important role in locating and searching data for disk layout. Classification and utilization of each index table are further described with table structures and examples. To handle the requirement of unlimited usage of objects, the invention comprises several special tables, comprising object index tables, free block index tables, and user object ID index tables.

Object Index Table

Object access is the core of the object-based storage device, wherein rapidly searching and massively storing objects are the core jobs of the disk layout. Thus, correspondent object indexes must be provided.

Table Structures and Links

An object index table applies a preset number of blocks, and the preset number is recorded in attributes of the root object. Suppose a block set comprising multiple blocks is insufficient for storing indexes, i.e. exceeding an upper threshold, another block set can be dynamically allocated according to the free block index table. When multiple block sets are linked, m block sets, for example, if the amount of stored data reaches the lower threshold of the (m−1)-th block set due to deletion of records, the m-th block set is released.

Figure 5:
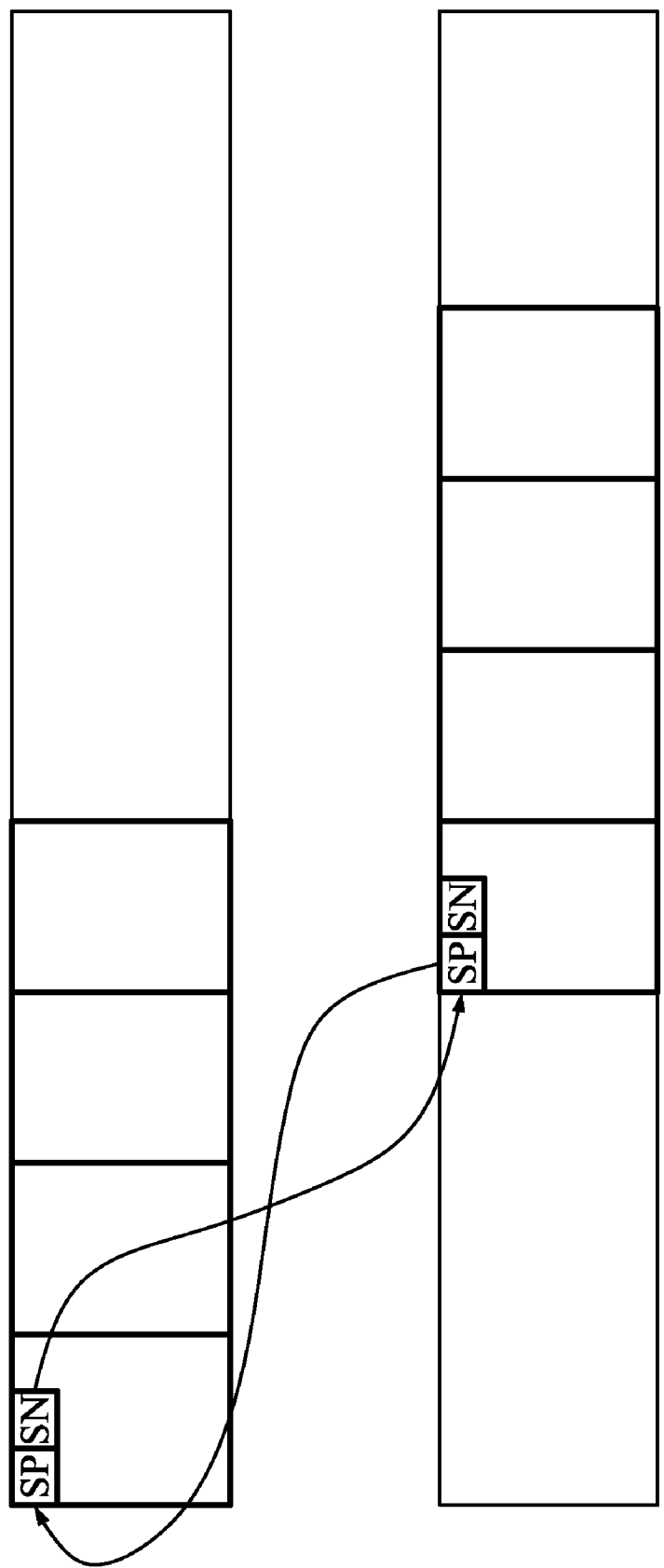
FIG. 5 is a schematic view of arrangement of relationships between block sets in an object index table of the exemplary embodiment consistent with the present invention.

Linking relationship is provided between block sets. Suppose a block location is assigned 32 bits (equal to 8 bytes), the 16 bytes in front of the first block of each block set are reserved. The preceding 8 bytes represent a start location of a previous block set (SP) for recording a location of the previous block set while the succeeding 8 bytes represent a start location of the next block set (SN) for recording a location of the next block set. The start location of the previous block set and the start location of the next block set are assigned NULL when only the block set is found while a start location of the previous block set for the first block set is assigned NULL and a start location of the next block set for the last block set is assigned NULL when multiple block sets are found. If data stored in one of the block set is about to be fully loaded, i.e. a threshold which belongs to the extra attributes of the root object is about to be exceeded, a new block set must be added, as shown in FIG. 5.

Records Storing in Object Index Tables

Object index tables comprise a partition object index table for the root object, collection object index tables for the partition object, and user object index tables. Each record stored in each of the object index tables represents an object index. The format of the object index is represented by "Object ID+Location" and the number of recordable indexes of an object index table of a block set is represented by:

$$\text{The number of recordable indexes} = \frac{[\text{The-size-of-a-block-set}] - SP - SN}{IndexLength}.$$

When the length of an object ID, comprising the partition ID, the collection ID, or the user object ID, is 32 bits (4 bytes) and the block location is fixedly assigned 32 bits, the length of a record is represented by "Object ID+Location"=8 bytes. Thus, when a block with 4K bytes stores records wherein each record is assigned 8 bits, (4096−8−8)/8=510 records can be stored.

Further, when the length of an object ID is 64 bits (8 bytes) and the block location is fixedly assigned 32 bits, the length of a record is represented by "Object ID+Location"=12 bytes. Thus, when a block with 4K bytes stores records, wherein each record is assigned 12 bits and 16 bits of the SP and SN are subtracted from the block, (4096−8−8)/12=340 records can be stored.

The object index table is composed of multiple linked block sets and, a block set comprising 16 blocks, occupies data space with 16×4K=64K bytes. If the length of an object ID is 32 bits, (16×4096−8−8)/8=8190 object indexes can be stored in a block set. If the length of an object ID is 64 bits, (16×4096−8−8)/12=5460 object indexes can be stored in a block set.

Free Block Index Table

A free block index table is defined in the root object. When a space is desired, a request is sent to the root object to ask for the appropriate size of free blocks. Each record stored in the free block index table represents a continuous free space. When multiple free blocks are dispersive in the disk, multiple index records are stored in the table. The format of each record is represented as "Location+Length".

Suppose that a block set comprises 8 blocks, the free block index table occupies disk space with 8×4K=32K bytes and (8×4096−8−8)/8=4094 discontinuous disk space can be recorded.

Recorded contents may be changed due to adding, removing, and modifying operations that modify the start location or length of the continuous blocks due to mergence generated by the releasing of blocks. When the disk is being formatted, damaged blocks may be ignored and only normal blocks are recorded in the free block index table. Thus, if no damaged blocks are generated while the disk is being formatted, only a record is generated in the free block index table after the format is complete. Alternatively, if damaged blocks are generated while the disk is being formatted, multiple records corresponding to the undamaged blocks are generated in the free block index table after the format is complete.

User Object ID Index Table of the Collection Object

The collection object comprises either attributes thereof or records storing the user object ID. The user object ID records are stored in a user object ID index table. The user object ID index table can serve as data of the collection object and record user object IDs. Increment and decrement of the user object ID index table are implemented using the described threshold rule. When a block set comprises 4 blocks, the user object ID index table occupies data space with 4×4K=16K bytes.

When the length of the object ID is 32 bits, (4096/4)×4=4096 user object IDs can be recorded. When the length of the object ID is 64 bits, (4096/8)×4=2048 user object IDs can be stored.

Description of Accessing Each of the Objects

Root Object

Attribute blocks of the root object are first stored, a free block index table for logic units of a disk is stored using a block set, and a partition object index table is stored using a block set. Access operations of the partition object are described in the following.

With respect to adding a partition object, a record recording an appropriate size of blocks to the partition object is retrieved from the free block index table. The blocks comprise attributes of the partition object, a collection object index table comprising a preset number of blocks, and a user object index table comprising a preset number of blocks. A partition object index is then added to the partition object index table and some attributes of the root object are modified. When configuration of the partition has been completed, the start location of the record is backward shifted behind the used blocks.

Removing a partition object comprises mandatory removal and non-mandatory removal. Mandatory removal removes all collection and user objects from the partition object and then the partition object can be removed. Non-mandatory removal means the partition object cannot be removed unless these are no collection and user objects. At that time, system returns occupied blocks of the partition object to the free block index table, and root object removes the index of the partition object from the partition object index table, and modifies relative attributes of the root object.

Modifying a partition object should only modify relative attributes of the partition object.

Partition Object

Figure 6:
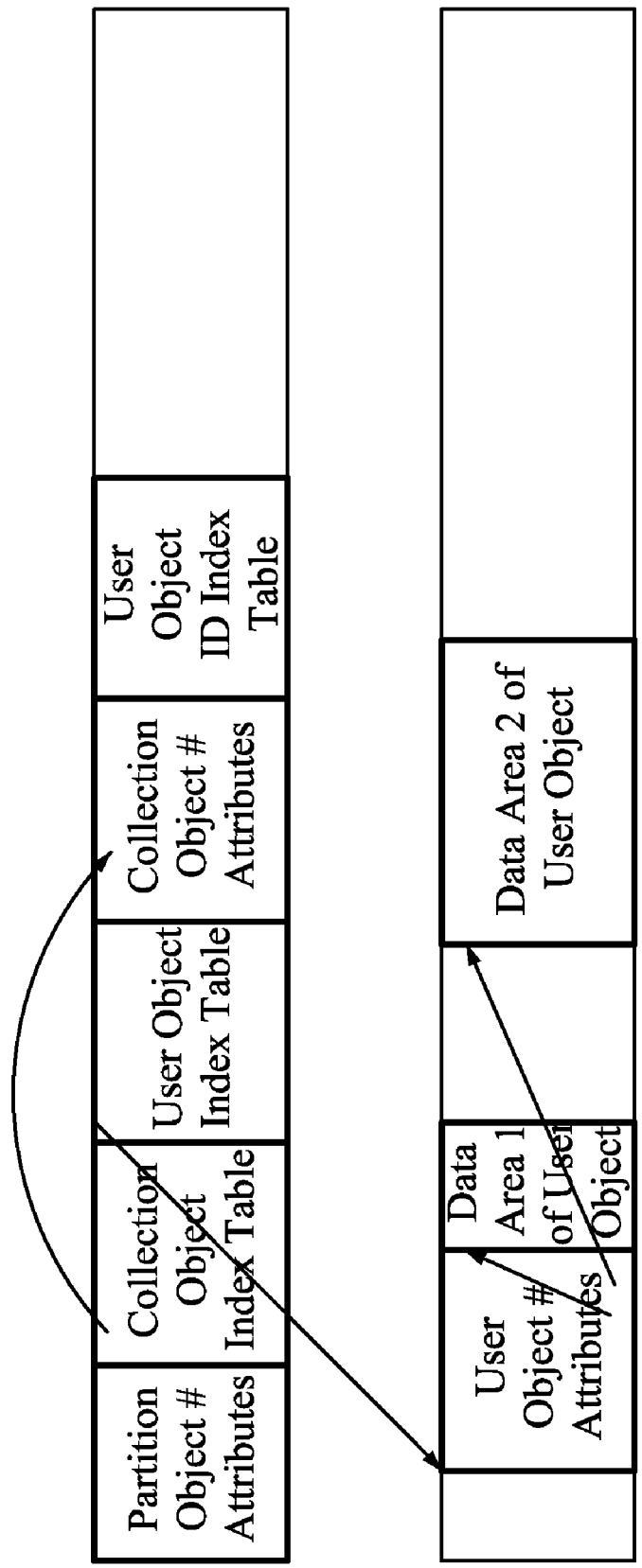
FIG. 6 is a schematic view of layout of a partition object the exemplary embodiment consistent with the present invention.

Attribute blocks of the partition object are first stored, and a block set of collection object index tables and a block set of user object index tables are stored respectively. The collection object index table is optional. If the system does not support the collection object, the collection object index table cannot be stored. Content access of the partition object is shown in FIG. 6.

Modifying the Size of a Partition Object

Only relative attributes of the partition object are modified.

Access of Collection Object

Access of a collection object is optional, wherein it is determined whether the collection object is a supported object when a disk is being formatted. The access comprises adding and removing collection objects. Adding a collection object retrieves an appropriate size of blocks from the free block index table for storing attributes of the collection object and a user object ID index table, adding a collection object index to the collection object index table of the partition object, and modifying relative attributes of the partition and root object.

Removal of a collection object removes the collection object index from the collection object index table of a partition object, releases blocks used for the attributes of the collection and the user object ID index table and returns the released blocks to the free block index table of the root object, and modifies relative attributes of the partition and root object.

Access of User Object

Access of a user object comprises adding a user object, removing a user object, and modifying data blocks of a user block.

Adding a user object first retrieves available blocks from the free block index table of the root object, comprising blocks storing attributes and data, adding a user object index to the user object index table of the partition object, and modifying relative attributes of the partition and root object.

Removing a user object releases blocks storing the attributes and data of the user object and returns the blocks to the free block index table of the root object, removes the user object index from the user object index table of the partition object, and modifies relative attributes of the partition and root object.

The location and size of the occupied data blocks are stored in the attributes of the user object. When the data amount changes, content of the attributes of the user object and the free block index table of the root object are changed.

Note that a partition object is not created according to the partition object index table but is generated by an application. When a partition object is generated, an ID index of the partition object is then generated and stored in the partition object index table of root object.

Collection Object (Optional)

A collection object is optionally supported by a disk, which is determined to be added when the disk is being formatted. When a collection object is supported, ID indexes of a user object can be added or removed. The ID indexes of the user object are stored in the user object ID index table of the collection object so addition and deletion for the index table can also be performed based on the described rule.

Note that a collection object is not created according to the collection object index table but is generated by an application. When a collection object is generated, an ID index of the collection object is then generated and stored in the collection object index table of a partition object.

User Object

Figure 7:
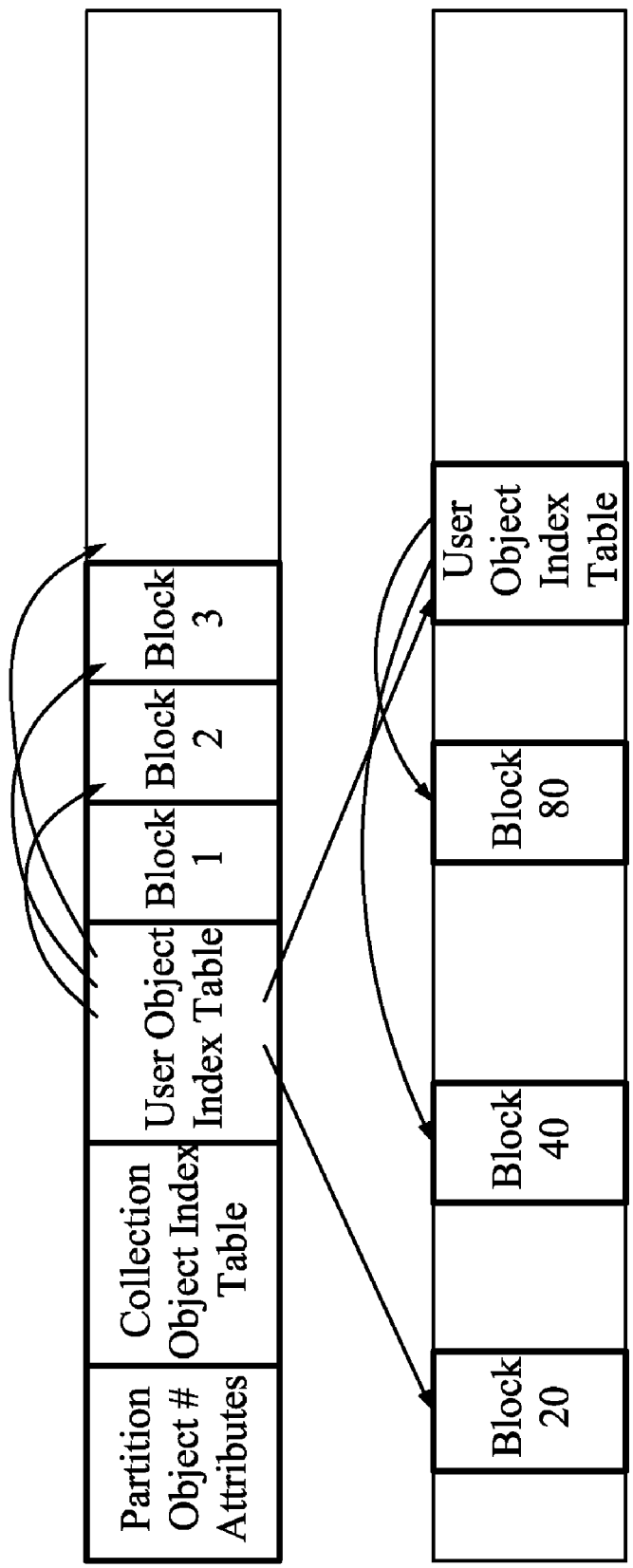
FIG. 7 is a schematic view of content access of a user object the exemplary embodiment consistent with the present invention.

The user object is used for storing data. As shown in FIG. 7, when space of a previous block set of user object index table is insufficient, a new block set is applied.

Access of a user object comprises adding a user object, deleting a user object, and modifying data of a user object.

Adding a user object retrieves an appropriate size of space from the free block index table. If sufficient continuous space for a single record can not be retrieved wherein object data cannot be written in, discontinuous space from multiple records are retrieved and calculated to obtain a proper size of space to write the object data in the space. Next, attributes of the user object are modified and another data record is added to the user object index table of the partition object.

Removal of a user object removes the ID index from the user object index table of the partition object and returns blocks of the attributes to the free block index table of the root object. Based on the attributes of the user object, when a user object belongs to some collection objects, the collection objects corresponding to the user object must be found according to the collection object index table of the partition object, and ID records of the user object are removed from the user object ID index table of the collection object.

Data access may change disk space. If storage space which is pre-configured is sufficient, attributes of a data length of a user object can be directly modified. If the storage space which is pre-configured is insufficient, extra blocks in the free block index table of the root object must be requested. When redundant blocks are generated as data is removed, the blocks are returned to the free block index table of the root object.

When in-property data is applied, only attributes of the data length of the user object are modified if data is reduced. If the data length is increased wherein data cannot be stored in the attribute, free blocks are requested from the free block index table of the root object and the in-property data is moved to the allocated blocks. Support or no support of the attributes can be preset while the disk is being formatted or changed while setting of the attributes is being performed.

The above briefly describes disk layout and functions and utilizations of each of the objects of the invention. Implementation of a disk layout method for object-based storage devices of the present invention is then described in the following.

Note that a user object is not created according to the user object index table but is generated by an application. When a user object is generated, an ID index of the user object is then generated and stored in the user object index table.

Figure 8A:
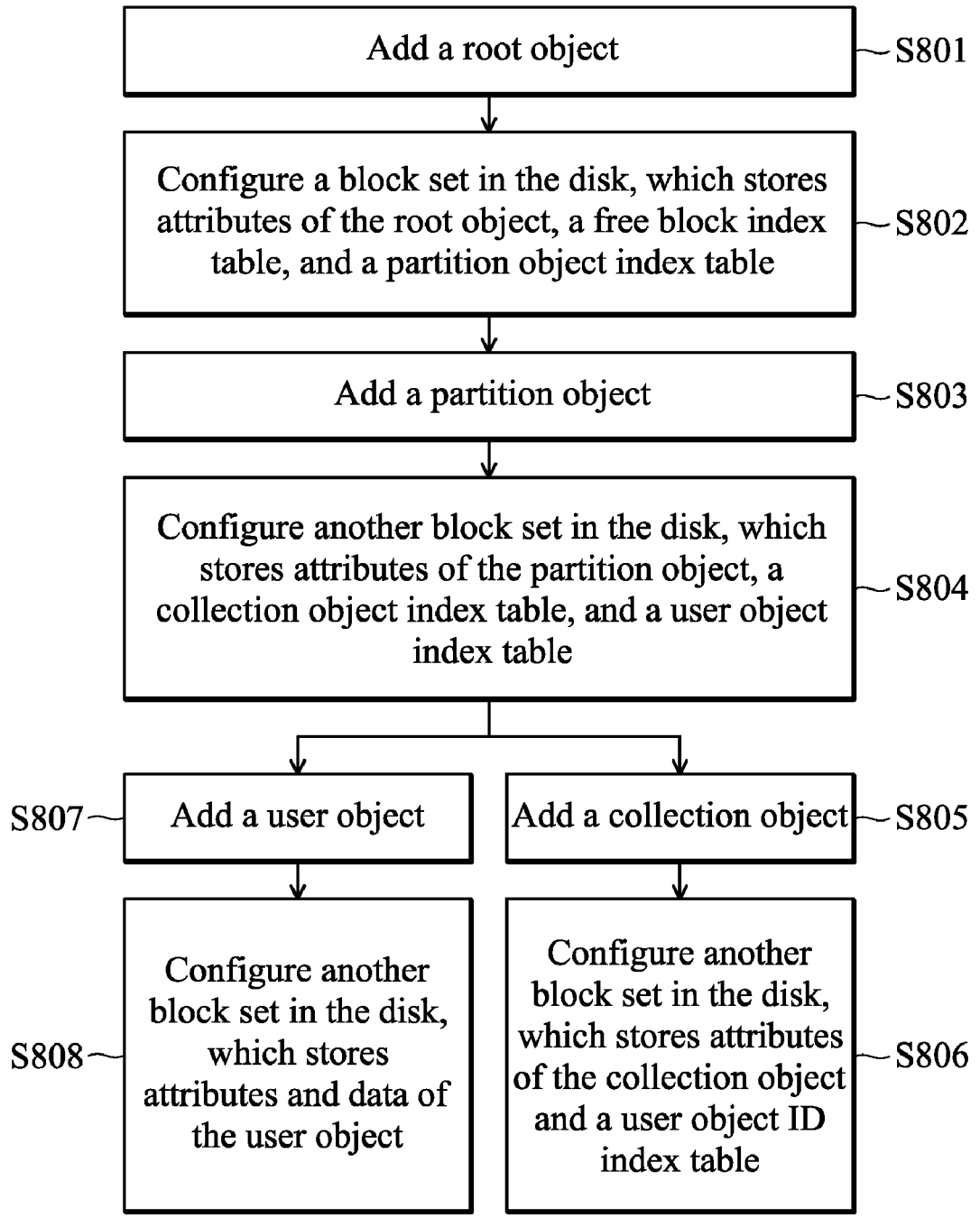
FIGS. 8A~8D are flowcharts of a disk layout method for object-based storage devices of the exemplary embodiment consistent with the present invention.

FIG. 8A shows a flowchart of a disk layout method for object-based storage devices of the present invention.

Figure 9:
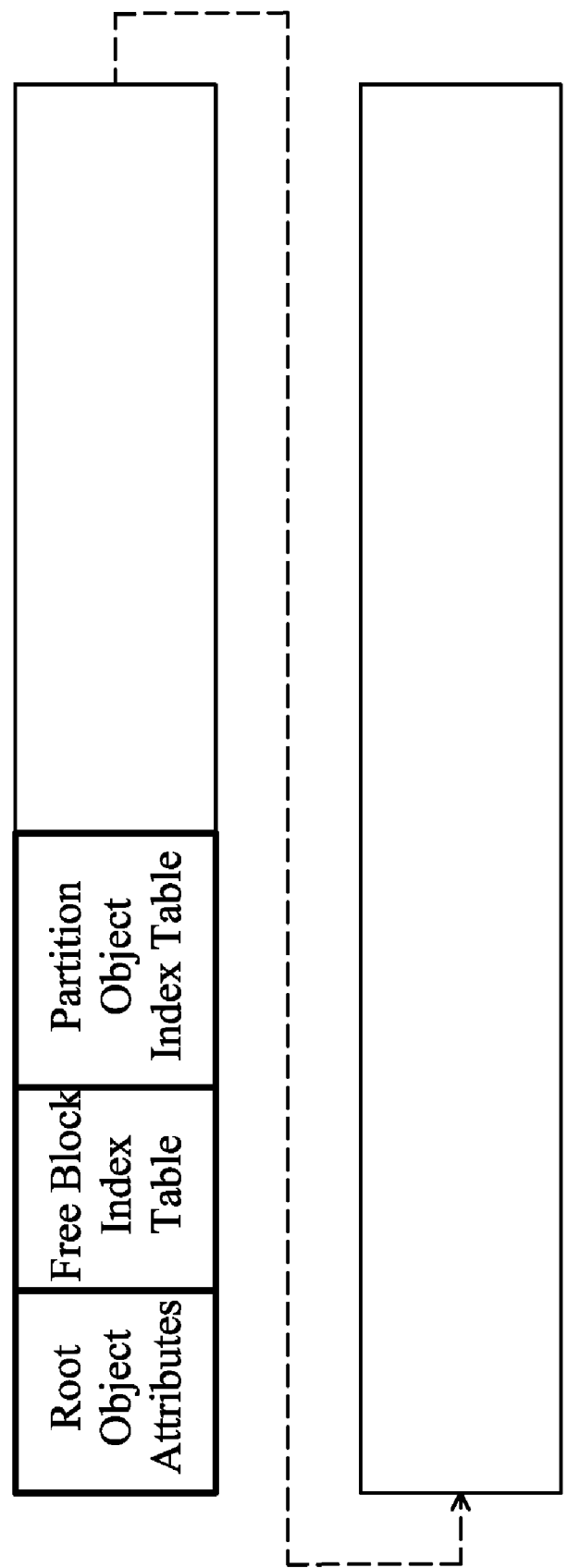
FIGS. 9~14 are workflows of disk layout for object-based storage devices of the exemplary embodiment consistent with the present invention.

A disk is initialized and a root object is added to the disk (step S801). A block set is configured in the disk, which stores attributes of the root object, a free block index table, and a partition object index table (step S802). The root object indexes a location of a partition object according to the partition object index table, as shown in FIG. 9.

Note that the block set allocated to the root object comprises block storing attributes of the root object, one or more blocks which are used by the free block index table, and one or more blocks which are used by the partition object index table. The blocks are defined based on the attributes of the root object which are determined after the disk has been formatted. That is to say, the blocks are determined according to format parameters or preset values.

Figure 10:
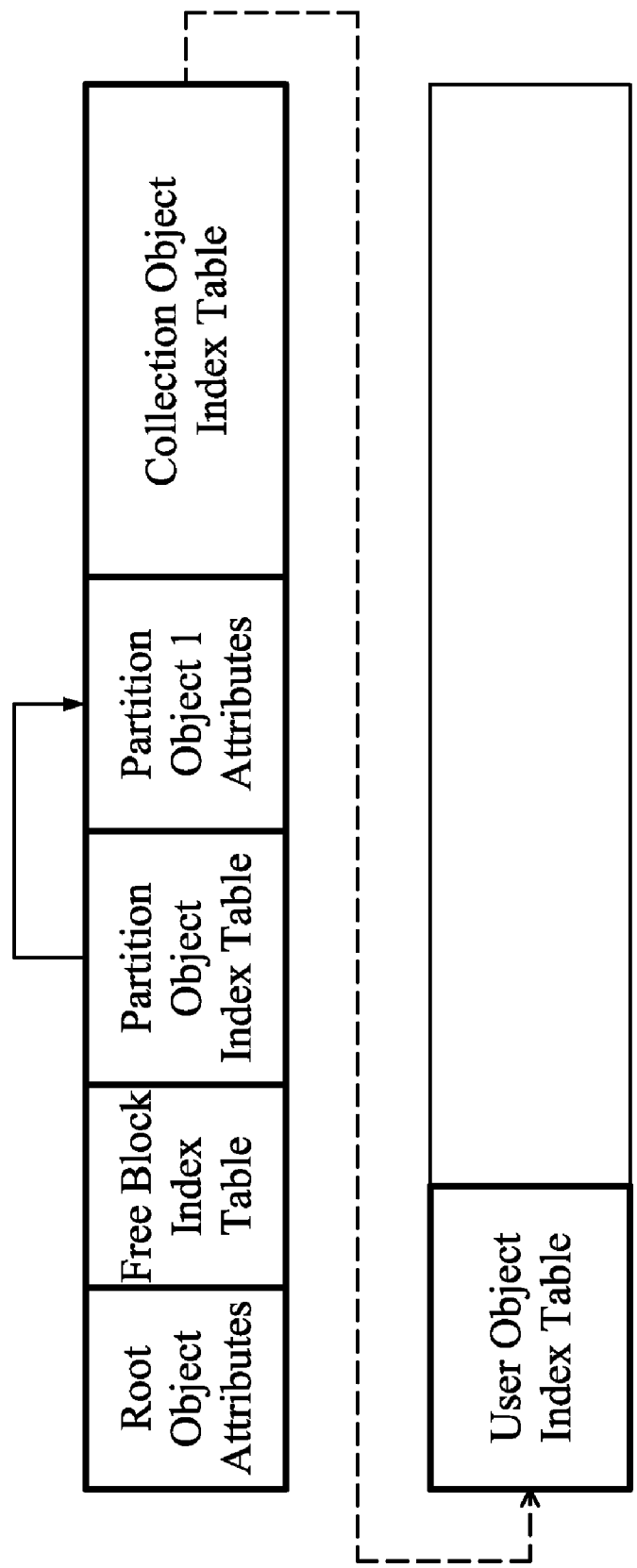
Figure 11:
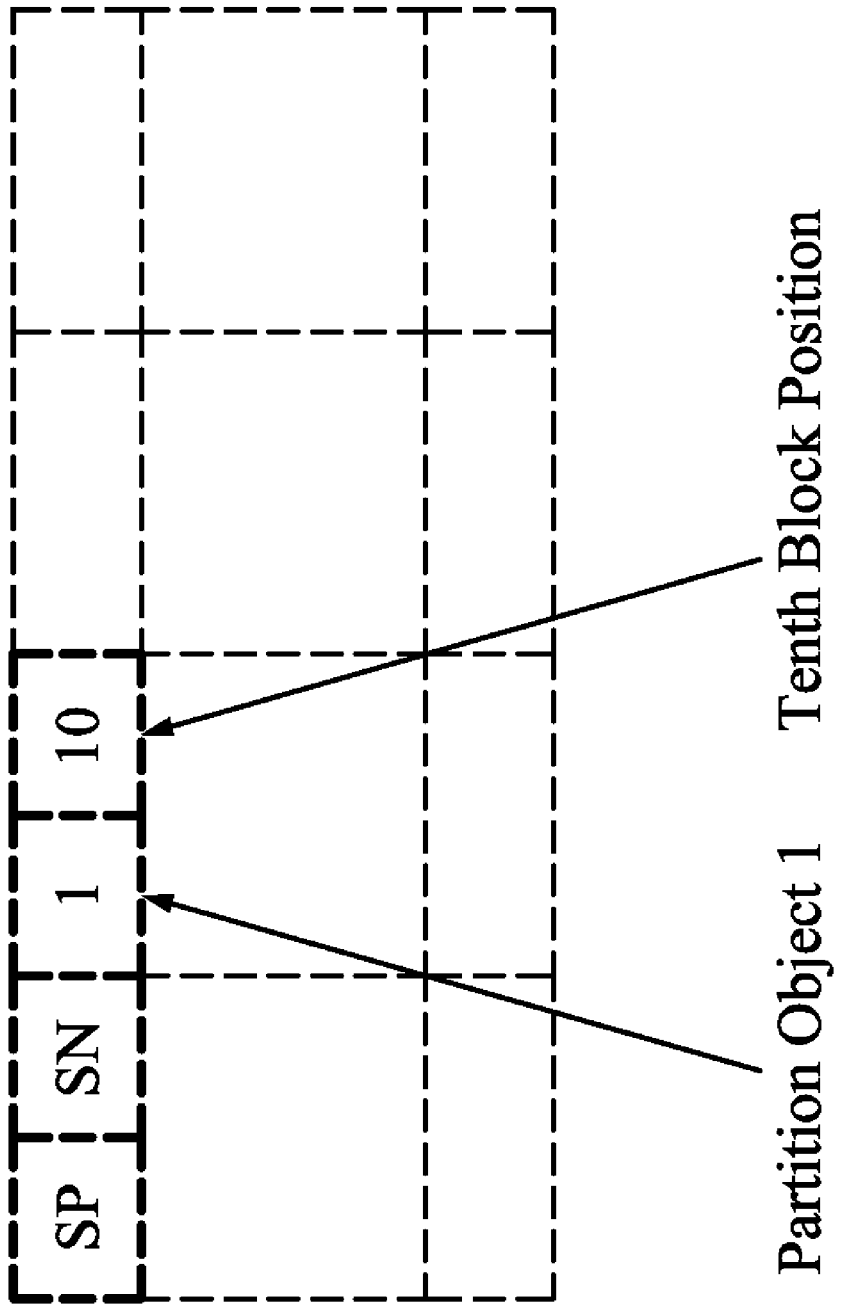

When a partition object is added to the disk (step S803), another block set is configured in the disk, which stores attributes of the partition object, a collection object index table, and a user object index table (step S804). The partition object indexes a location of a collection object according to the collection object index table and a location of a user object according to the user object index table, as shown in FIG. 10. Further, content of the partition object index table is shown in FIG. 11, in which the first partition resides in the tenth location.

Note that the block set allocated to the partition object comprises block storing attributes of the partition object, one or more blocks which are used by the collection object index table, and one or more blocks which are used by the user object index table. The blocks are defined based on the attributes of the root object which are determined after the disk has been formatted. That is to say, the blocks are determined according to format parameters or preset values.

Figure 12:
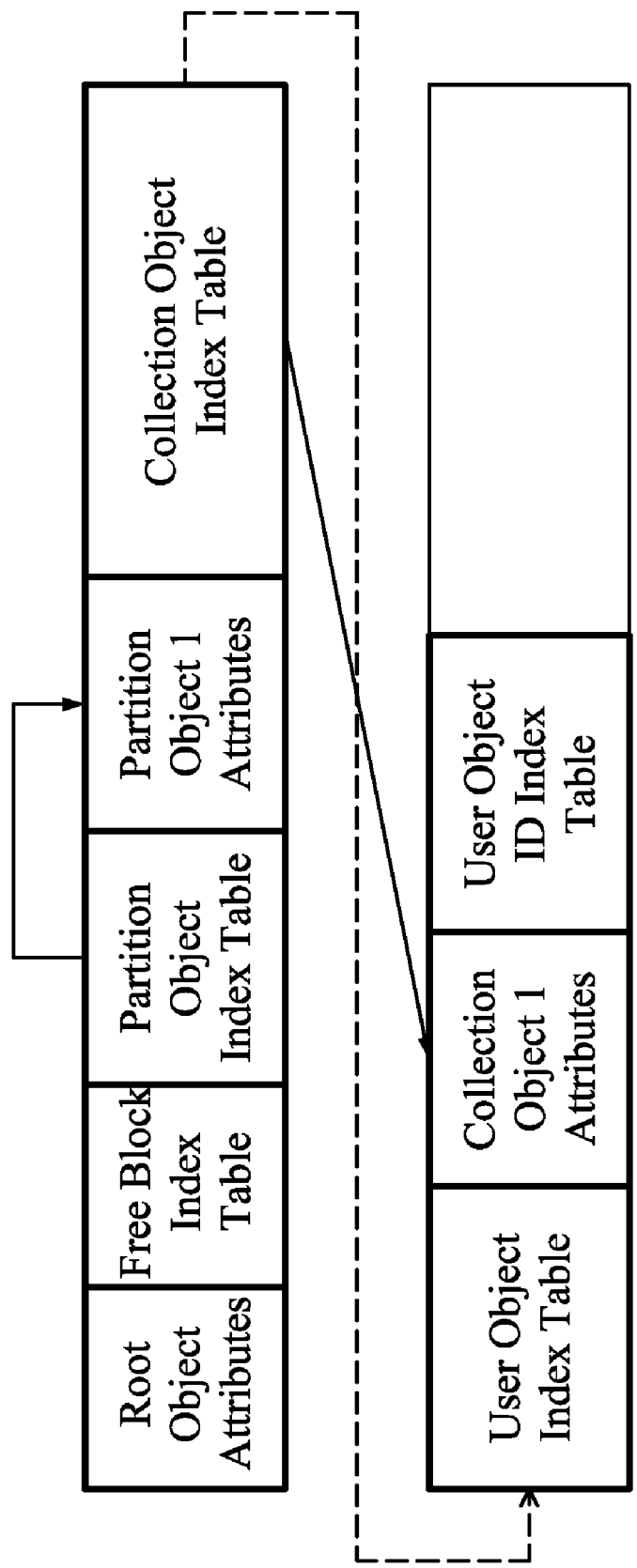

When a collection object is added to the disk (step S805), another block set is configured in the disk, which stores attributes of the first collection object and a user object ID index table (step S806). The collection object indexes user IDs according to the user object ID index table, as shown in FIG. 12. Thus, user objects collected by the first collection object can be known according to the user object ID index table.

Note that access of the collection object is optional. The block set allocated to the collection object comprises block storing attributes of the collection object and one or more blocks which are used by the user object ID index table. The blocks are defined based on the attributes of the root object which are determined after the disk has been formatted. That is to say, the blocks are determined according to format parameters or preset values.

Figure 13:
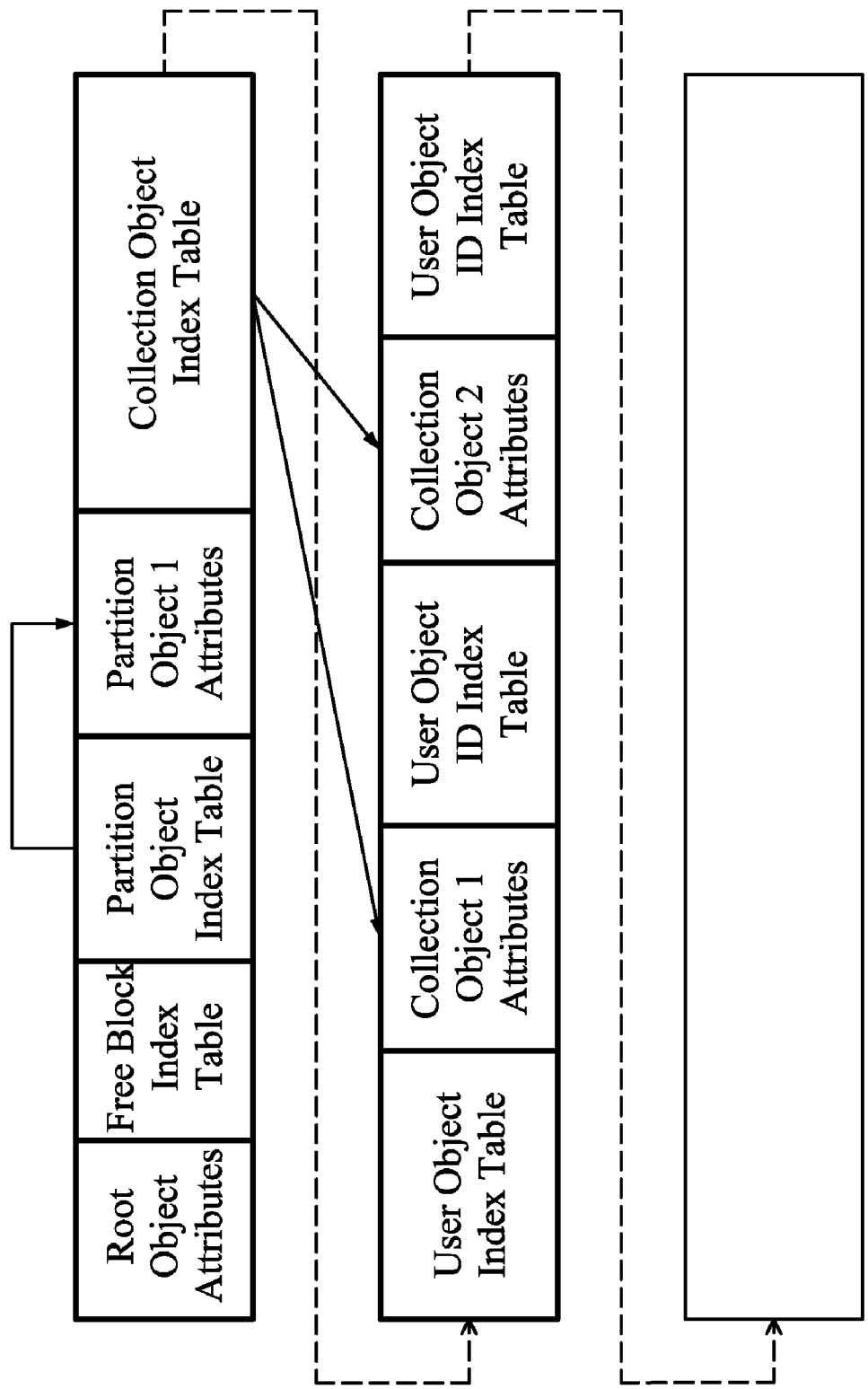

When another collection object is added to the disk, another block set is configured in the disk, which stores attributes of the second collection object and a user object ID index table. The second collection object indexes user IDs according to the user object ID index table, as shown in FIG. 13. Thus, user objects collected by the second collection object can be known according to the user object ID index table.

Figure 14:
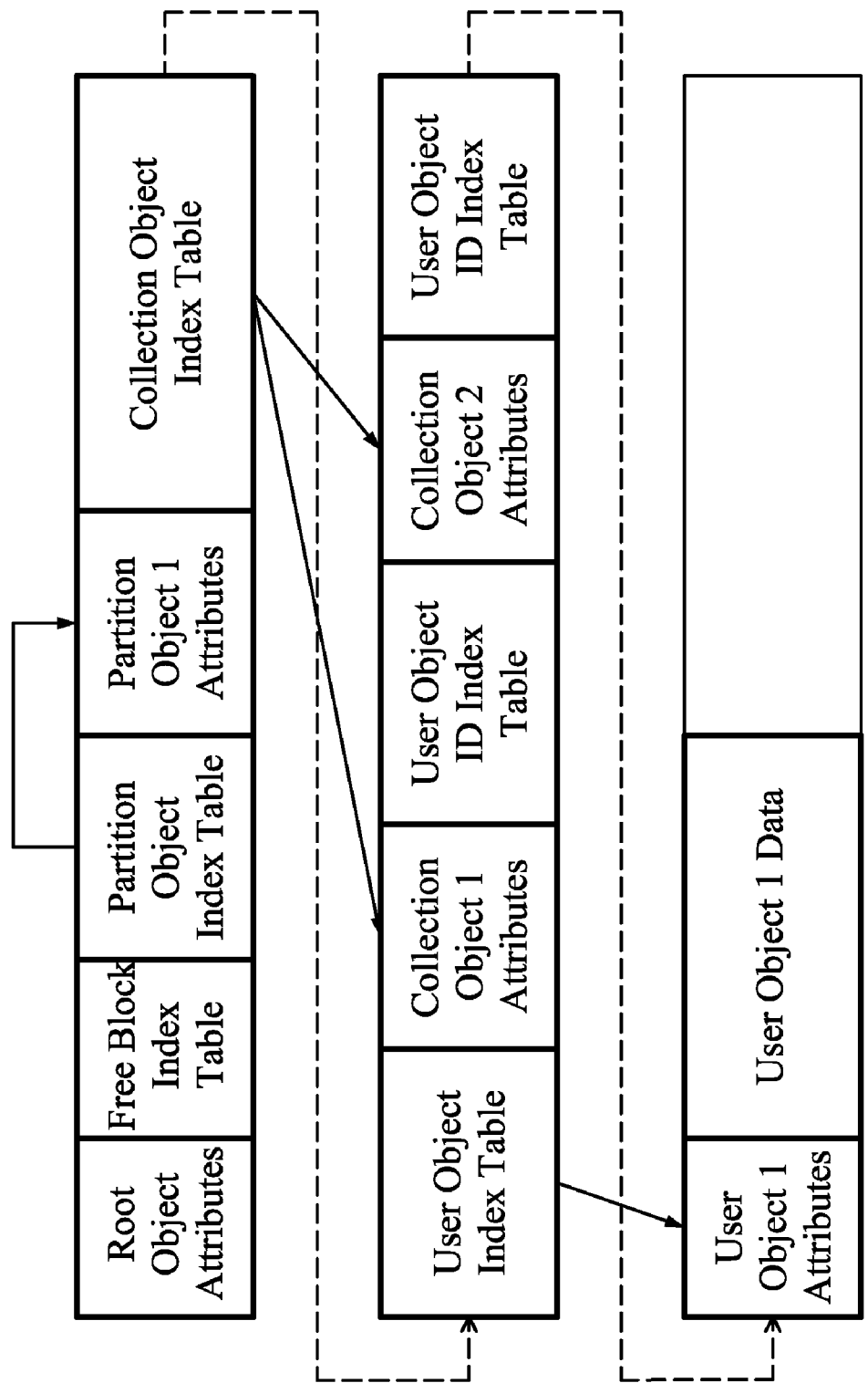

When a user object is added (step S807), another block set is configured in the disk, which stores attributes and data of the user object (step S808), as shown in FIG. 14. Note that the block set allocated to the user object comprises block storing attributes of the user object and 0 or more blocks which are used by the data blocks of the user object. The attribute blocks are fixedly allocated while the data blocks may be pre-located (without storing data) or dynamically extended. Locations of the data blocks are recorded in the attributes of the user object.

Note that an unlimited number of partition objects can be generated by the root object while unlimited numbers of collection and user objects can be generated by the partition object.

The following further describes adding and removing the partition, collection, and user objects.

Figure 8B:
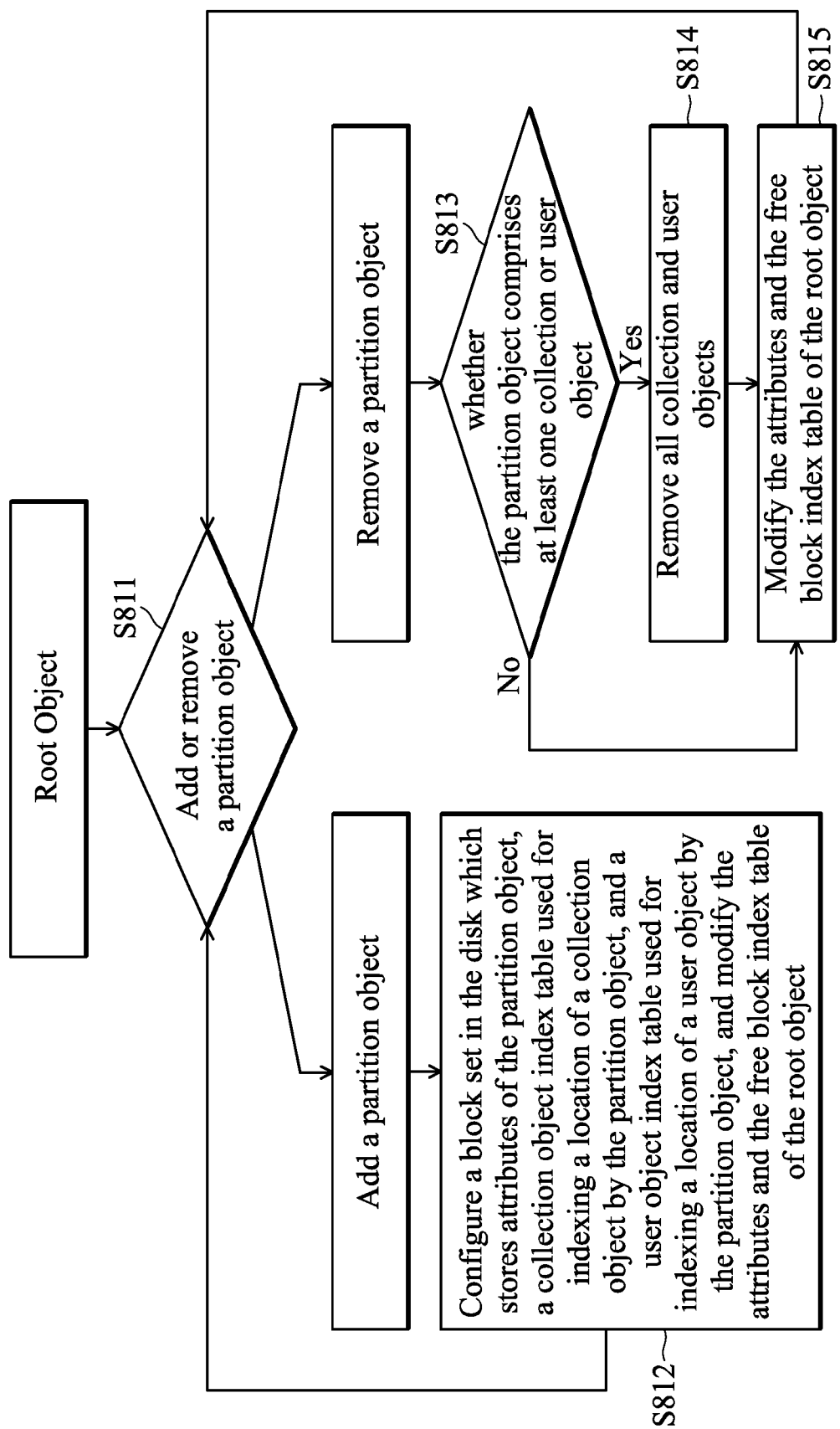

FIG. 8B shows a flowchart of adding and removing a partition object of the present invention.

First, it is determined whether adding or removing a partition object has been requested (step S811). If adding a partition object has been requested, a block set is configured in the disk which stores attributes of the partition object, a collection object index table used for indexing a location of a collection object by the partition object, and a user object index table used for indexing a location of a user object by the partition object, and the attributes and the free block index table of the root object are modified (step S812). Before a partition object is removed, it is necessary to determine whether the partition object comprises any collection or user object (step S813). All collection and user objects must be removed if the partition object comprises at least one collection or user object (step S814). The attributes and the free block index table of the root object are modified if the partition object does not comprise any collection or user object (step S815).

Figure 8C:
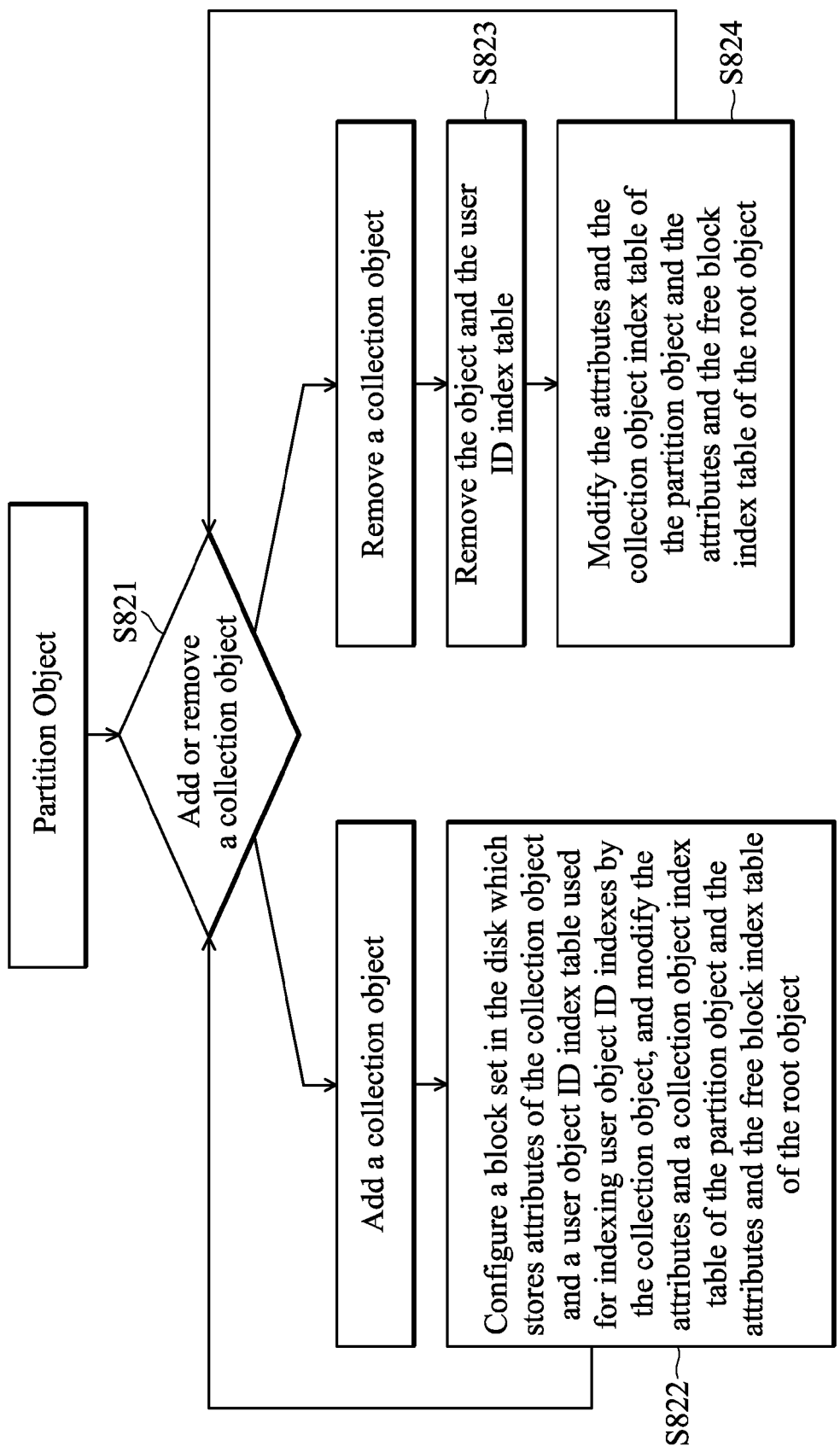

FIG. 8C shows a flowchart of adding and removing a collection object of the present invention.

First, it is determined whether adding or removing a collection object has been requested (step S821). If adding a collection object has been requested, a block set is configured in the disk which stores attributes of the collection object and a user object ID index table used for indexing user object ID indexes by the collection object, and the attributes and a collection object index table of the partition object and the attributes and the free block index table of the root object are modified (step S822). If a collection object is removed, the collection object and the user object ID index table are removed (step S823), and the attributes and the collection object index table of the partition object and the attributes and the free block index table of the root object are modified (step S824).

Figure 8D:
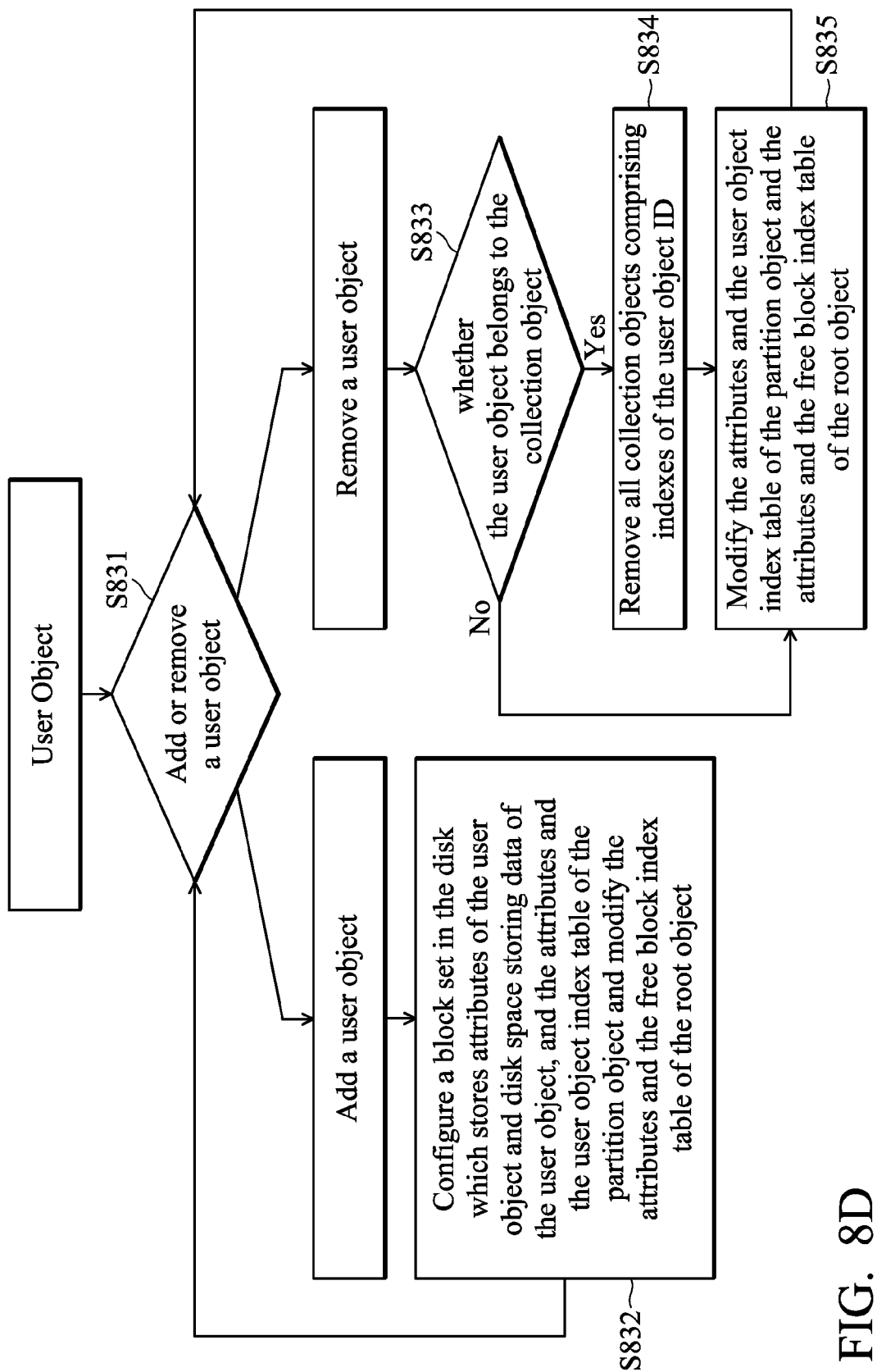

FIG. 8D shows a flowchart of adding and removing a user object of the present invention.

First, it is determined whether adding or removing a user object has been requested (step S831). If adding a user object has been requested, a block set is configured in the disk which stores attributes of the user object and disk space storing data of the user object, and the attributes and the user object index table of the partition object and the attributes and the free block index table of the root object are modified (step S832).

Before a user object is removed, it is determined whether the user object belongs to the collection object (step S833). All collection objects comprising indexes of the user object ID are removed if the user object belongs to the collection object (step S834). The attributes and the user object index table of the partition object and the attributes and the free block index table of the root object are modified if the user object belongs to the collection object (step S835).

As described, the disk layout method for object-based storage devices of the invention directly accesses objects from a storage device when an object management device is unavailable or cannot be found. Additionally, when the storage device cannot be transplanted with the object management device, objects can also be directly indexed and accessed from storage device without the object management device.

Index tables are applied for accessing objects so that a system implemented by the disk layout of the invention can be accessed based on data caching. The index tables occupy less memory space. When reading data of the index tables, one block set is read once a time into the memory and is pre-scanned and analyzed. During the scanning of the block set, unused index records of the index tables are also recorded. Index record holds, unused index records, are generated in the index tables is due to the reason of deleting objects that is index records are also deleted in the index tables. If locations of unused index records are found in the index tables, those record holes are first filled in with objects when adding objects. If no unused index records are found in the index tables, new index records are stored behind the last record in the index tables. When an index record to be removed is found, content of the index record is assigned 0 (indicating a NULL) and the record is removed. The speed of locating index records in the index tables will affect efficiency of disk layout. Sequential search or other searching algorithms can be implemented to search the records.

Sorted index records can be rapidly located and the sorting methods are based on functionality of each index table and index records are sorted according to different key values for embodiments of the invention.

The policy of block allocation is to allocate continuous blocks from a record with enough continuous free blocks in the free block index table of root object. When extra blocks are required due to changing of user data but subsequent continuous blocks cannot be allocated, nearest blocks are thus allocated and formed as a discontinuous space. When a new user data with large amount of data is added, blocks with continuous space are first allocated to store the data or multiple discontinuous blocks with continuous space are allocated to store the data. Unused blocks can be added, removed, and listed.

Searching index tables can be implemented using relative algorithm. Block sets allocated to each index table can be defined based on parameters. The index tables can be optimized using tools to shorten search time, such as sorting tables, so that more discontinuous space is eliminated.

As described, the invention has advantages as follows.

With respect to the disk layout, attributes of a root object, superblocks as configured in a conventional file system, a partition object index table, and a free block index table are provided. With respect to retrieving continuous space, a single free block index table retrieves the space and its records are extent-based. With respect to accessing object attributes, object attributes can be directly accessed, if locations of the objects are obtained. With respect to data access, data is retrieved from attributes or records stored in a block list. With respect to support of implementation, a core module is implemented using an OSD simulation file system under the Linux operating system.

With respect to object indexes, index tables maintain index records and can be read into memory as cache. Search algorithm would be helpful in finding exact index. With respect to data attributes, a continuous record is generated using file metadata by combining default object attributes and data. Extra attributes can be added and defined by implementers. With respect to hierarchical relationship between objects, hierarchical disk layout is clearly defined. All objects defined in specification are supported. With respect to support by operating systems, kernel modules are implemented according to requirements of buffer management systems, which are represented by a file-style or acts as an independent access method. With respect to hardware integration, an integrated circuit can be independently designed to access objects so the space management requested by the object-based storage device can be integrated in the storage device. Tables can be cached so that data can be directly located.

Methods and systems of the present disclosure, or certain aspects or portions of embodiments thereof, may take the form of a program code (i.e., instructions) embodied in media, such as floppy diskettes, CD-ROMS, hard drives, firmware, or any other machine-readable storage medium, wherein, when the program code is loaded into and executed by a machine, such as a computer, the machine becomes an apparatus for practicing embodiments of the disclosure. The methods and apparatus of the present disclosure may also be embodied in the form of a program code transmitted over some transmission medium, such as electrical wiring or cabling, through fiber optics, or via any other form of transmission, wherein, when the program code is received and loaded into and executed by a machine, such as a computer, the machine becomes an apparatus for practicing and embodiment of the disclosure. When implemented on a general-purpose processor, the program code combines with the processor to provide a unique apparatus with operating analogously to specific logic circuits.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A disk layout method for object-based storage devices, the method comprising:
   initializing a disk; and
   adding a root object, a partition object, and a user object to the disk;
   wherein
   the root object includes attributes of the root object, a free block index table, and a partition object index table;
   the root object indexes a location of the partition object according to the partition object index table;
   the partition object includes attributes of the partition object, a collection object index table, and a user object index table;
   the partition object indexes a location of a collection object according to the collection object index table and a location of the user object according to the user object index table;
   the user object includes attributes and data of the user object; and
   each of the index tables is stored in at least one block set of the disk, two quantitative bytes in the first block of each block set are reserved,
   a first one of the two quantitative bytes represents a start location of a previous block set (SP) which is located before and stores the index table together with the block set having the two quantitative bytes, and
   a second one of the two quantitative byte represents a start location of a subsequent block set (SN) which is located after and stores the index table together with the block set having the two quantitative bytes.

2. The disk layout method for object-based storage devices as claimed in claim 1, further comprising adding a collection object including attributes of the collection object and a user object ID index table, and the collection object indexes a user ID according to the user object ID index table.

3. The disk layout method for object-based storage devices as claimed in claim 1, wherein the partition object is obtained according to the partition object index table of the root object, the collection object is obtained according to the collection object index table of the partition object, and the user object is obtained according to the user object index table of the partition object.

4. The disk layout method for object-based storage devices as claimed in claim 1, wherein the partition object index table, the collection object index table, and the user object index table are composed of one or multiple block sets which respectively store the IDs and locations of partition objects, collection objects, and user objects.

5. The disk layout method for object-based storage devices as claimed in claim 1, wherein each record stored in the free block index table represents continuous and unused space and the format of each record is represented by a location plus a continuous block length.

6. The disk layout method for object-based storage devices as claimed in claim 2, wherein the user object ID is directly indexed by the user object ID index table of the collection object.

7. The disk layout method for object-based storage devices as claimed in claim 6, wherein the user object ID is added to the user object ID index table of the collection object when the user object is written in the disk and belongs to the collection object.

8. The disk layout method for object-based storage devices as claimed in claim 1, wherein the attributes of the root object have information recording of free block sets in the disk, a number of block sets for the attributes, records relating to each object index table, a length of a location block, a length of an object ID, a counter relating to the object ID, and customized values, the attributes of the partition object have records relating to recordings of the collection object index table and the user object index table, comprising start locations and sizes of index tables whenever configured, and the attributes of the collection object have a size and location of the user object ID index table.

9. The disk layout method for object-based storage devices as claimed in claim 1, wherein the data of the user object can be stored and represented by in-property data.

10. The disk layout method for object-based storage devices as claimed in claim 9, wherein the user object determines the data thereof is stored in an extra block list if the data is not represented by the in-property data, wherein the block list is composed of multiple continuous records and each of the records stores locations and lengths of data blocks.

11. The disk layout method for object-based storage devices as claimed in claim 1, wherein each object index table uses a predetermined number of blocks which are recorded in the attributes of the root object.

12. The disk layout method for object-based storage devices as claimed in claim 1, wherein the start location of the previous block set and the start location of the next block set for the block set are assigned NULL when only the block set is found while a start location of the previous block set (SP) for the first block set is assigned NULL and a start location of the next block set (SN) for the last block set is assigned NULL when multiple block sets are found.

13. The disk layout method for object-based storage devices as claimed in claim 1, wherein each record stored in each of the object index tables represents an object index wherein the format of the object index is represented by "Location+Object ID" and the number of recordable indexes of an object index table of a block set is represented by:

$$\text{The number of recordable indexes} = \frac{[\text{The-size-of-a-block-set}] - SP - SN}{IndexLength}.$$

14. The disk layout method for object-based storage devices as claimed in claim 1, wherein adding, removing, and modifying operations are implemented to each of the objects.

15. The disk layout method for object-based storage devices as claimed in claim 14, further comprising:
adding a partition object to the disk, wherein the partition object includes attributes of the partition object, a collection object index table used for indexing a collection object by the partition object and a user object index table used for indexing a user object by the partition object; and
modifying the attributes and the free block index table of the root object.

16. The disk layout method for object-based storage devices as claimed in claim 15, wherein, when a partition object is removed, said method further comprises:
determining whether the partition object comprises at least one collection or user object;
removing all collection objects and user objects if the partition object comprises at least one collection or user object; and
modifying the attributes and the free block index table of the root object if the partition object does not comprise any collection or user object.

17. The disk layout method for object-based storage devices as claimed in claim 16, further comprising:
adding a collection object to the disk, wherein the collection object includes attributes of the collection object and a space storing user object ID index table which is used to index user object ID; and
modifying the attributes and the collection object index table of the partition object and the attributes and the free block index table of the root object.

18. The disk layout method for object-based storage devices as claimed in claim 17, wherein, when a collection object is removed, said method further comprises:
removing the collection object and the user object ID index table; and
modifying the attributes and the collection object index table of the partition object and the attributes and the free block index table of the root object.

19. The disk layout method for object-based storage devices as claimed in claim 15, further comprising:
adding a user object to the disk, wherein the collection object includes attributes of the user object and a space storing data of the user object; and
modifying the attributes and the user object index table of the partition object and the attributes and the free block index table of the root object.

20. The disk layout method for object-based storage devices as claimed in claim 19, wherein, when a user object is removed, said method further comprises:
determining whether the user object belongs to the collection objects;
removing all user object ID from user object ID index table of collection objects if the user object belongs to the collection objects; and
modifying the attributes and the user object index table of the partition object and the attributes and the free block index table of the root object.

21. A non-transitory computer-readable medium encoded with computer executable instructions for causing, when executed by a processor, the processor to perform a disk layout method for object-based storage devices, wherein the method comprises:
initializing the disk; and
adding a root object, a partition object, and a user object to the disk;
wherein
the root object includes attributes of the root object, a free block index table, and a partition object index table;
the root object indexes a location of the partition object according to the partition object index table;
the partition object includes attributes of the partition object, a collection object index table, and a user object index table;
the partition object indexes a location of a collection object according to the collection object index table and a location of the user object according to the user object index table;
the user object includes attributes and data of the user object; and
each of the index tables is stored in at least one block set of the disk, two quantitative bytes in the first block of each block set are reserved,
a first one of the two quantitative bytes represents a start location of a previous block set (SP) which is located before and stores the index table together with the block set having the two quantitative bytes, and
a second one of the two quantitative byte represents a start location of a subsequent block set (SN) which is located after and stores the index table together with the block set having the two quantitative bytes.

22. The non-transitory computer-readable medium as claimed in claim 21, said method further comprising adding a collection object including attributes of the collection object and a user object ID index table, and the collection object indexes a user ID according to the user object ID index table.

23. The non-transitory computer-readable medium as claimed in claim 21, wherein, in said method, the partition object is obtained according to the partition object index table of the root object, the collection object is obtained according to the collection object index table of the partition object, and the user object is obtained according to the user object index table of the partition object.

24. The non-transitory computer-readable medium as claimed in claim 21, wherein, in said method, the partition object index table, the collection object index table, and the user object index table are composed of one or multiple block sets which respectively store the IDs and locations of partition objects, collection objects, and user objects.

25. The non-transitory computer-readable medium as claimed in claim 21, wherein, in said method, each record stored in the free block index table represents continuous and unused space and the format of each record is represented by a location plus a continuous block length.

26. The non-transitory computer-readable medium as claimed in claim 21, wherein, in said method, the user object ID is directly indexed by the user object ID index table of the collection object.

27. The non-transitory computer-readable medium as claimed in claim 26, wherein, in said method, the user object ID is added to the user object ID index table of the collection object when the user object is written in the disk and belongs to the collection object.

28. The non-transitory computer-readable medium as claimed in claim 21, wherein, in said method, the attributes of the root object have information recording of free block sets in the disk, a number of block sets for the attributes, records relating to each object index table, a length of a location block, a length of an object ID, a counter relating to the object ID, and customized values, the attributes of the partition object have records relating to recordings of the collection object index table and the user object index table, comprising start locations and sizes of a index tables whenever configured, and the attributes of the collection object have a size and location of the user object index table.

29. The non-transitory computer-readable medium as claimed in claim 21, wherein, in said method, the data of the user object can be stored and represented by in-property data.

30. The non-transitory computer-readable medium as claimed in claim 29, wherein, in said method, the user object determines the data thereof is stored in an extra block list if the data is not represented by the in-property data, wherein the block list is composed of multiple continuous records and each of the records stores locations and lengths of data blocks.

31. The non-transitory computer-readable medium as claimed in claim 21, wherein, in said method, each object index table uses a predetermined number of blocks which are recorded in the attributes of the root object.

32. The non-transitory computer-readable medium as claimed in claim 21, wherein, in said method, the start location of the previous block set and the start location of the next block set for the block set are assigned NULL when only the block set is found while a start location of the previous block set (SP) for the first block set is assigned NULL and a start location of the next block set (SN) for the last block set is assigned NULL when multiple block sets are found.

33. The non-transitory computer-readable medium as claimed in claim 31, wherein, in said method, each record stored in each of the object index tables represents an object index, and the format of the object index is represented by a location plus a continuous block length and the number of recordable indexes of an object index table of a block set is represented by:

$$\text{The number of recordable indexes} = \frac{[\text{The-size-of-a-block-set}] - SP - SN}{IndexLength}.$$

34. The non-transitory computer-readable medium as claimed in claim 31, wherein, in said method, adding, removing, and modifying operations are implemented to each of the objects.

35. The non-transitory computer-readable medium as claimed in claim 34, said method further comprising:
    adding a partition object to the disk, wherein the collection object includes attributes of the partition object, a collection object index table used for indexing a collection object by the partition object and a user object index table used for indexing a user object by the partition object; and
    modifying the attributes and the free block index table of the root object.

36. The non-transitory computer-readable medium as claimed in claim 35, wherein, when a partition object is removed, said method further comprises:
    determining whether the partition object comprises at least one collection or user object;
    removing all collection objects and user objects if the partition object comprises at least one collection or user object; and
    modifying the attributes and the free block index table of the root object if the partition object does not comprise any collection or user object.

37. The non-transitory computer-readable medium as claimed in claim 36, said method further comprising:
    adding a collection object to the disk, wherein the collection object includes attributes of the collection object and a space storing user object ID index table which is used to index user object ID; and
    modifying the attributes and the collection object index table of the partition object and the attributes and the free block index table of the root object.

38. The non-transitory computer-readable medium as claimed in claim 37, wherein, when a collection object is removed, said method further comprises:
    removing the collection object and the user object ID index table; and
    modifying the attributes and the collection object index table of the partition object and the attributes and the free block index table of the root object.

39. The non-transitory computer-readable medium as claimed in claim 35, said method further comprising:
    adding a user object to the disk, wherein the collection object includes attributes of the user object and a space storing data of the user object; and
    modifying the attributes and the user object index table of the partition object and the attributes and the free block index table of the root object.

40. The non-transitory computer-readable medium as claimed in claim 39, wherein, when a user object is removed, said method further comprises:
    determining whether the user object belongs to the collection object;
    removing all user object ID from user object ID index table of collection objects if the user object belongs to the collection objects; and
    modifying the attributes and the user object index table of the partition object and the attributes and the free block index table of the root object if the user object does not belong to the collection object.

41. A disk layout method for object-based storage devices, comprising:

configuring a disk to allocate:

a root object, comprising attributes of the root object, a free block index table, and a partition object index table which is used by the root object to index a location of a partition object;

at least one partition object, comprising attributes of the partition object, a collection object index table which is used by the partition object to index a location of a collection object, and a user object index table which is used by the partition object to index a location of a user object; and at least one user object, comprising attributes and data of the user object;

wherein each of the index tables is stored in at least one block set of the disk, two quantitative bytes in the first block of each block set are reserved, a first one of the two quantitative bytes represents a start location of a previous block set (SP) which is located before and stores the index table together with the block set having the two quantitative bytes, and a second one of the two quantitative byte represents a start location of a subsequent block set (SN) which is located after and stores the index table together with the block set having the two quantitative bytes.

42. The disk layout method for object-based storage devices as claimed in claim 41, wherein the disk further comprises at least one collection object including attributes of the collection object and a user object ID index table which is used by the collection object to index a user object ID.

* * * * *